I. A. STOCKWELL.
FLEXIBLE COUPLING.
APPLICATION FILED MAY 9, 1917. RENEWED DEC. 19, 1919.
1,362,646.
Patented Dec. 21, 1920.
2 SHEETS—SHEET 1.
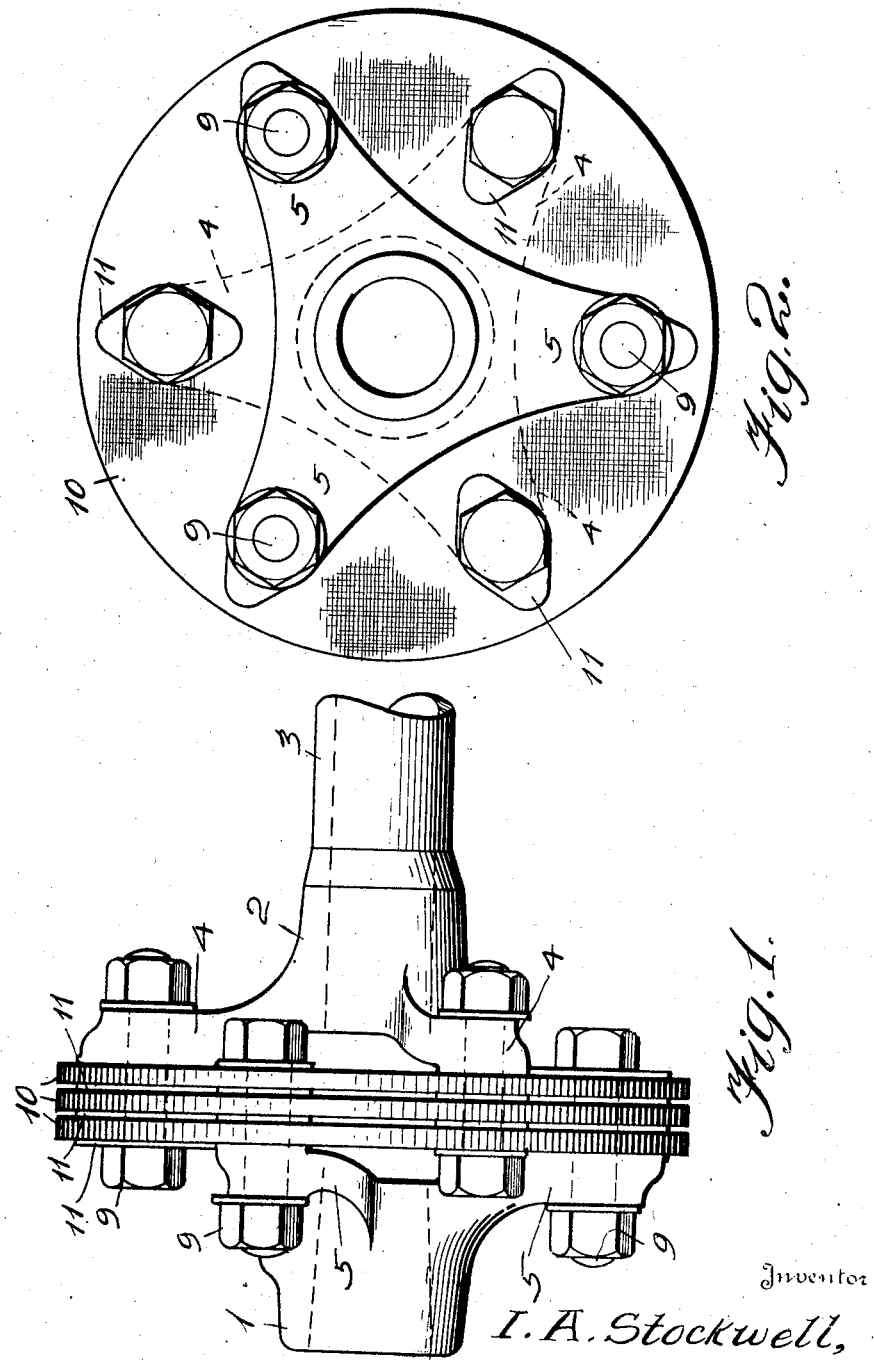
Inventor
I. A. Stockwell,
By Norman J. Whitaker
Attorney I. A. STOCKWELL.
FLEXIBLE COUPLING.
APPLICATION FILED MAY 9, 1917. RENEWED DEC. 19, 1919.

1,362,646.

Patented Dec. 21, 1920.
2 SHEETS—SHEET 2.

I. A. Stockwell, Inventor

By Norman T. Whitaker
Attorney

UNITED STATES PATENT OFFICE.

IVAN A. STOCKWELL, OF NORWALK, OHIO, ASSIGNOR TO THE NORWALK AUTO PARTS COMPANY, OF NORWALK, OHIO, A CORPORATION OF OHIO.

FLEXIBLE COUPLING.

1,362,646.   Specification of Letters Patent.   Patented Dec. 21, 1920.

Application filed May 9, 1917, Serial No. 167,593. Renewed December 19, 1919. Serial No. 346,171.

*To all whom it may concern:*

Be it known that I, IVAN A. STOCKWELL, a citizen of the United States, and resident of Norwalk, in the county of Huron and State of Ohio, have invented new and useful Improvements in Flexible Couplings, of which the following is a specification.

This invention relates to improvements in flexible couplings for propeller shafts, and is designed more particularly for use in connection with motor vehicles, although it may be adapted for use in connection with any driven or driving shafts.

The primary object of this invention is to provide an improved form of coupling which may be easily and inexpensively manufactured and one which will be strong and durable in operation.

Other objects and advantages will be apparent from the course of the following description, taken in conjunction with the accompanying drawings, and the particular features of novelty will be pointed out in the appended claims.

Figure 3:
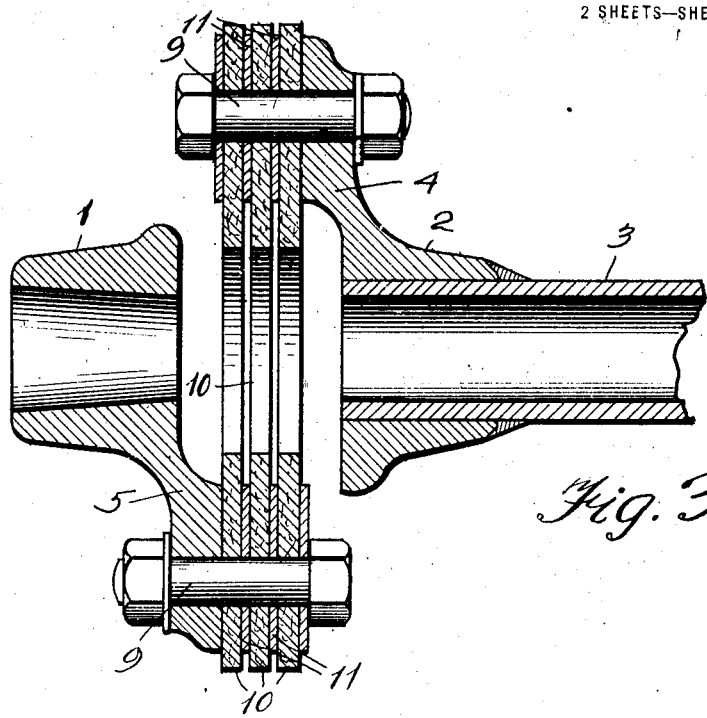
Figure 4:
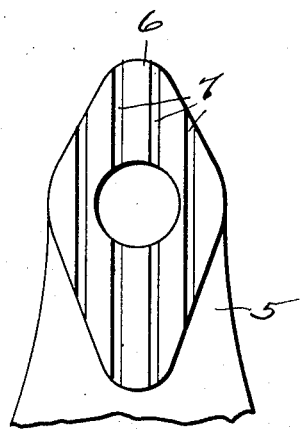
Figures 6, 7:
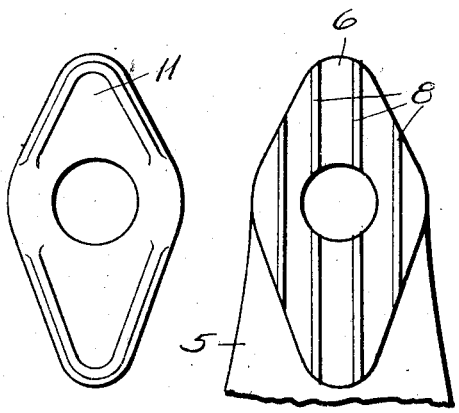
Figure 5:
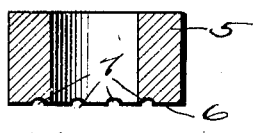

Referring to the drawings, in which similar characters of reference denote similar parts in the views, Figure 1 is a side elevation of the coupling, Fig. 2 is a front view of the coupling, Fig. 3 is a vertical sectional view of the coupling, Fig. 4 is an enlarged front view of one of the faces of the spider, Fig. 5 is a vertical sectional view of Fig. 4, Fig. 6 is a modified form of Fig. 4, and Fig. 7 is a view of one of the washers used with the invention.

Referring more particularly to the drawings, the numerals 1 and 2 indicate the hubs of what may be called jaw members, which hubs are designed to be secured respectively to the ends of the driving and driven shafts, one of which is shown at 3. These hubs are each provided with three radiating arms 4 and 5 which are positioned alternately as shown in Fig. 2.

As shown in Fig. 4, the faces 6 of the radiating arms 4 and 5 are provided with a series of longitudinal grooves 7, or as shown in Fig. 6 may be provided with a series of longitudinal raised portions 8. In other words, these faces 6 are serrated.

Flexibly connected to the jaw members 1 and 2, by means of bolts 9 passing through the radial arms 4 and 5, are flexible disks 10 which may be of thermoid rubber. Between each of the disks 10 and mounted on the bolts 9 is a washer 11, which may be of the type shown in Fig. 7. These washers serve as a spacing means for the disks thereby permitting them to move laterally one upon the other, such movement being due to variations in the relative position of one spider to the other when the coupling is rotated as a whole and the shafts are disposed out of alinement with respect to each other.

It is to be noted that these washers approximate in size and shape the faces 6 of the arms 5 and that one of said washers is placed on each bolt 9 adjacent the bolt head and one of the fiber disks 10. The washer mounted upon the bolt 9, adjacent the bolt head, together with the washers disposed between the disks serve, as a result of their broad bearing faces, to evenly distribute the strain of rotation set up within the disks when the driving shaft is transmitting power to the driven shaft through the coupling. When the nut carried by the bolt 9 is tightened upon the disks 10 the adjacent faces thereof become embedded in the serrated portions of the arms 5 and the irregular faces of the washers 11 as shown become embedded in the disks 10. Thus it is seen that by this construction the strain of rotation set up within the disks is not only evenly distributed throughout the same, but the disks together with the arms and other correlated parts are held securely against displacement.

From the above description, it is believed that the construction and operation of this device will be readily understood by those skilled in the art to which it appertains, but I desire it understood that various minor changes in the form and proportion of the device may be made within the scope of the appended claims without departing from the spirit of the invention.

Having thus described my invention, what I claim as new and desire to secure by Letters Patent is:—

1. The combination with a flexible coupling comprising coupling members and flexible disks disposed therebetween; of means for spacing the flexible disks, said means comprising washers provided with upstanding ribs disposed upon one side thereof.

2. The combination with a flexible coupling comprising coupling members having radially extending arms provided with elongated serrated faces, and disks disposed between the coupling members; of spacing means for said disks, said spacing means comprising a plurality of elongated washers disposed between said disks, said washers being homologous with said faces and provided with a plurality of ribs.

IVAN A. STOCKWELL.